(12) United States Patent
Lowell

(10) Patent No.: US 10,950,232 B2
(45) Date of Patent: Mar. 16, 2021

(54) NON-VERBAL SPEECH COACH

(71) Applicant: Healables, Ltd., Jerusalem (IL)

(72) Inventor: Avi Lowell, West Hempstead, NY (US)

(73) Assignee: Healables, Ltd., Jerusalem (IL)

(*) Notice: Subject to any disclaimer, the term of this patent is extended or adjusted under 35 U.S.C. 154(b) by 51 days.

(21) Appl. No.: 16/123,743

(22) Filed: Sep. 6, 2018

(65) Prior Publication Data
US 2019/0122663 A1   Apr. 25, 2019

Related U.S. Application Data

(60) Provisional application No. 62/554,924, filed on Sep. 6, 2017.

(51) Int. Cl.
| | |
|---|---|
| *G10L 15/22* | (2006.01) |
| *G10L 25/18* | (2013.01) |
| *G10L 25/72* | (2013.01) |
| *G10L 25/51* | (2013.01) |
| *G10L 25/90* | (2013.01) |

(52) U.S. Cl.
CPC .............. *G10L 15/22* (2013.01); *G10L 25/18* (2013.01); *G10L 25/51* (2013.01); *G10L 25/72* (2013.01); *G10L 25/90* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 5,563,358 A | * | 10/1996 | Zimmerman | G09B 15/00 84/454 |
| 6,963,841 B2 | | 11/2005 | Handal et al. | |
| 8,907,195 B1 | * | 12/2014 | Erol | G10H 1/361 84/609 |
| 2017/0160813 A1 | * | 6/2017 | Divakaran | G06N 20/10 |
| 2017/0206064 A1 | * | 7/2017 | Breazeal | G06F 8/36 |
| 2019/0122663 A1 | * | 4/2019 | Lowell | G10L 25/18 |

* cited by examiner

*Primary Examiner* — Marcus T Riley
(74) *Attorney, Agent, or Firm* — Neil R. Jetter; Jetter & Associates, P.A.

(57) ABSTRACT

A speech training coach includes a communications device having a processor coupled to at least one memory, a transceiver, a speaker, a microphone, and a display screen driven by a display driver controlled by the processor. At least a first portion of a speech collection, speech analysis and speech coaching algorithm (algorithm) is stored in the memory for analyzing speech volume, speech speed, and speech pitch using reference values for each. The microphone for collecting a speaker's voice sample. The algorithm is for in essentially real-time scoring based on the reference values and displaying on the display screen scores for the speech volume, speech speed, and the speech pitch and for displaying an auditory or tactile recommendation for changing one's speech or for providing a favorable speech assessment.

9 Claims, 6 Drawing Sheets

100

---

101

COLLECTING A SPEAKER'S VOICE SAMPLE IN A COMMUNICATIONS DEVICE COMPRISING A MICROPHONE THAT IS COUPLED TO A PROCESSOR WHICH RUNS AT LEAST A FIRST PORTION OF A SPEECH COLLECTION (ALGORITHM), SPEECH ANALYSIS AND SPEECH COACHING ALGORITHM STORED IN A MEMORY THAT ANALYZES SPEECH VOLUME, SPEECH SPEED, AND SPEECH PITCH USING REFERENCE VALUES FOR EACH, AND HAS A DISPLAY SCREEN DRIVEN BY A DISPLAY DRIVER CONTROLLED BY THE PROCESSOR.

102

THE ALGORITHM IN ESSENTIALLY REAL-TIME SCORING THIS SPEAKER'S VOICE SAMPLE BASED ON THE REFERENCE VALUES AND DISPLAYING ON THE DISPLAY SCREEN SCORES FOR THE SPEECH VOLUME, SPEECH SPEED, AND THE SPEECH PITCH, AND DISPLAYING A RECOMMENDATION FOR CHANGING ONE'S SPEECH OR PROVIDING A FAVORABLE SPEECH ASSESSMENT IF ALL THESE PARAMETERS ARE DETERMINED BY COMPARISON TO THE REFERENCE VALUES TO MEET THE REFERENCE VALUES OR RANGES SET.

100 ⟶

101
COLLECTING A SPEAKER'S VOICE SAMPLE IN A COMMUNICATIONS DEVICE COMPRISING A MICROPHONE THAT IS COUPLED TO A PROCESSOR WHICH RUNS AT LEAST A FIRST PORTION OF A SPEECH COLLECTION (ALGORITHM), SPEECH ANALYSIS AND SPEECH COACHING ALGORITHM STORED IN A MEMORY THAT ANALYZES SPEECH VOLUME, SPEECH SPEED, AND SPEECH PITCH USING REFERENCE VALUES FOR EACH, AND HAS A DISPLAY SCREEN DRIVEN BY A DISPLAY DRIVER CONTROLLED BY THE PROCESSOR.

↓

102
THE ALGORITHM IN ESSENTIALLY REAL-TIME SCORING THIS SPEAKER'S VOICE SAMPLE BASED ON THE REFERENCE VALUES AND DISPLAYING ON THE DISPLAY SCREEN SCORES FOR THE SPEECH VOLUME, SPEECH SPEED, AND THE SPEECH PITCH, AND DISPLAYING A RECOMMENDATION FOR CHANGING ONE'S SPEECH OR PROVIDING A FAVORABLE SPEECH ASSESSMENT IF ALL THESE PARAMETERS ARE DETERMINED BY COMPARISON TO THE REFERENCE VALUES TO MEET THE REFERENCE VALUES OR RANGES SET.

FIG. 1

NON-VERBAL SPEECH COACH

CROSS REFERENCE TO RELATED APPLICATIONS

This application claims the benefit of Provisional Application Ser. No. 62/554,924 entitled "NON-VERBAL SPEECH COACH", filed on Sep. 6, 2017, which is herein incorporated by reference in its entirety.

FIELD

Disclosed embodiments relate to voice training.

BACKGROUND

Speech recognition technology is known where a human voice is interfaced to a computing device that receives the speech and then processes the speech with a speech recognition program. In a conventional speech recognition system, an acoustic signal from a speaker received by a microphone is converted to an analog electrical signal that is input into circuitry on a voice circuit board which digitizes the signal.

The computer then generates a spectrogram which, for a series of time intervals, records those frequency ranges at which the sound exists and the intensity of sound in each of those frequency ranges. The spectrogram is a series of spectrographic displays, one for each of a plurality of time intervals which together form an audible sound to be recognized. Each spectrographic display shows the distribution of energy as a function of frequency during the time interval. This method can be used for detecting and providing feedback to the user for correcting mispronunciation by comparing pronunciations against a stored database.

SUMMARY

This Summary is provided to introduce a brief selection of disclosed concepts in a simplified form that are further described below in the Detailed Description including the drawings provided. This Summary is not intended to limit the claimed subject matter's scope.

Disclosed speech coaching recognizes speech has two distinct aspects being a verbal side (the words themselves as part of a verbal message) and the generally overlooked non-verbal side which is sometimes referred to as "paralanguage" that relates to all aspects of the voice which are not part of the verbal message. Non-verbal voice parameters include the pitch (being the frequency of the sound waves) of the voice, the speed and volume (or intensity) at which a message is delivered, and pauses and hesitations between words too, as well as the interruptions of other speakers if present. Sound intensity is generally measured by a microphone (e.g., in decibels) and is perceived as sound volume. The sound volume is proportional to the amplitude of the sound wave. The frequency of a sound wave is perceived as the pitch.

Disclosed speech coaching generally comprises a software package (an application) that is regarding the non-verbal side of speech which is ignored by known speech coaching products. Most individuals focus on the verbal side/content of their speech and are thus not even aware of the non-verbal (pitch, speed, and volume) features of their voice. As a result, the spoken message can get lost because the non-verbal parameters are counterproductive and it is out of tune with the verbal message. Disclosed speech coaching processes the speaker's voice and in response makes the speaker aware of his or her volume, speed, and pitch of their voice by providing essentially real-time (i.e., only delayed by the circuit computation time) feedback that enables the speaker to use a disclosed non-verbal speech coach to improve the non-verbal side of their speech.

BRIEF DESCRIPTION OF THE DRAWINGS

Reference will now be made to the accompanying drawings, which are not necessarily drawn to scale, wherein:

FIG. 1 is a flow chart showing steps for an example method of non-verbal speech training, according to an embodiment of the invention.

DETAILED DESCRIPTION

Figure 2A:
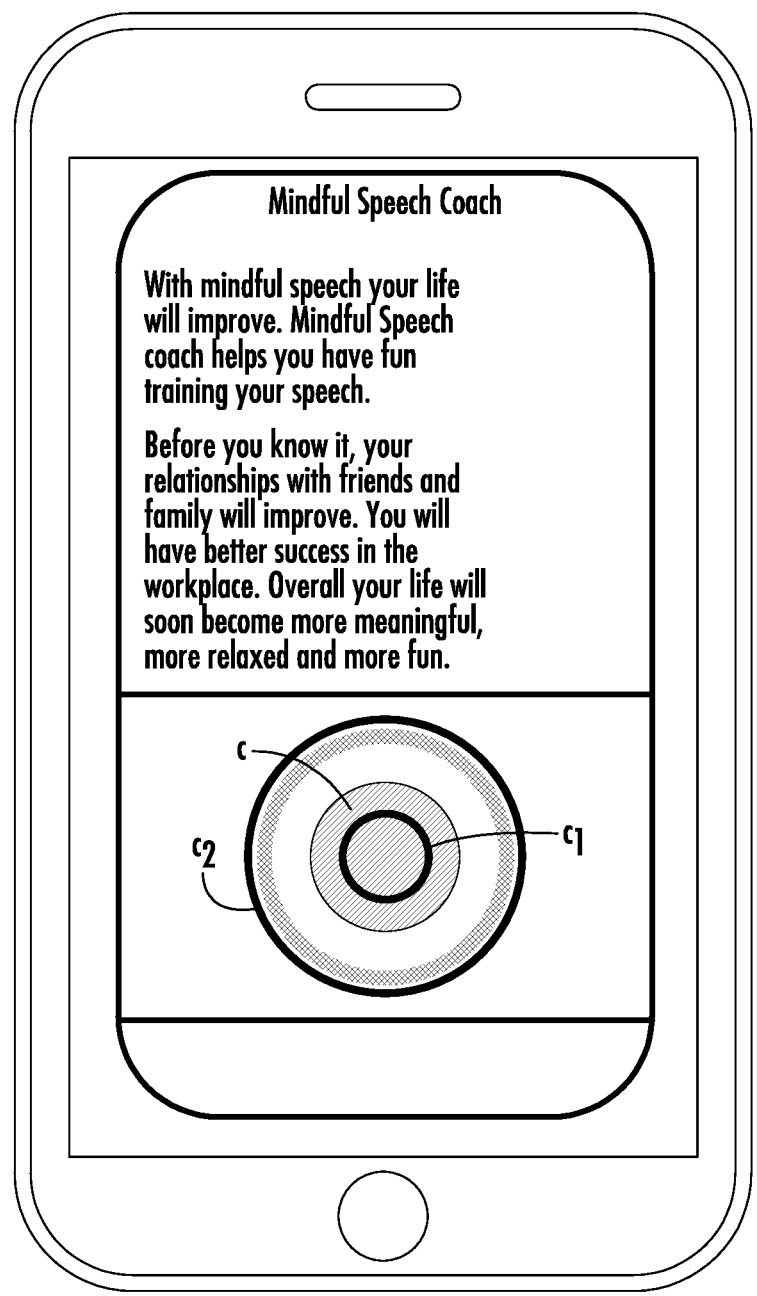
FIGS. 2A-D are scanned screen shots showing example operation a disclosed non-verbal speech coach, according to an embodiment of the invention.

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments.

Figure 3:
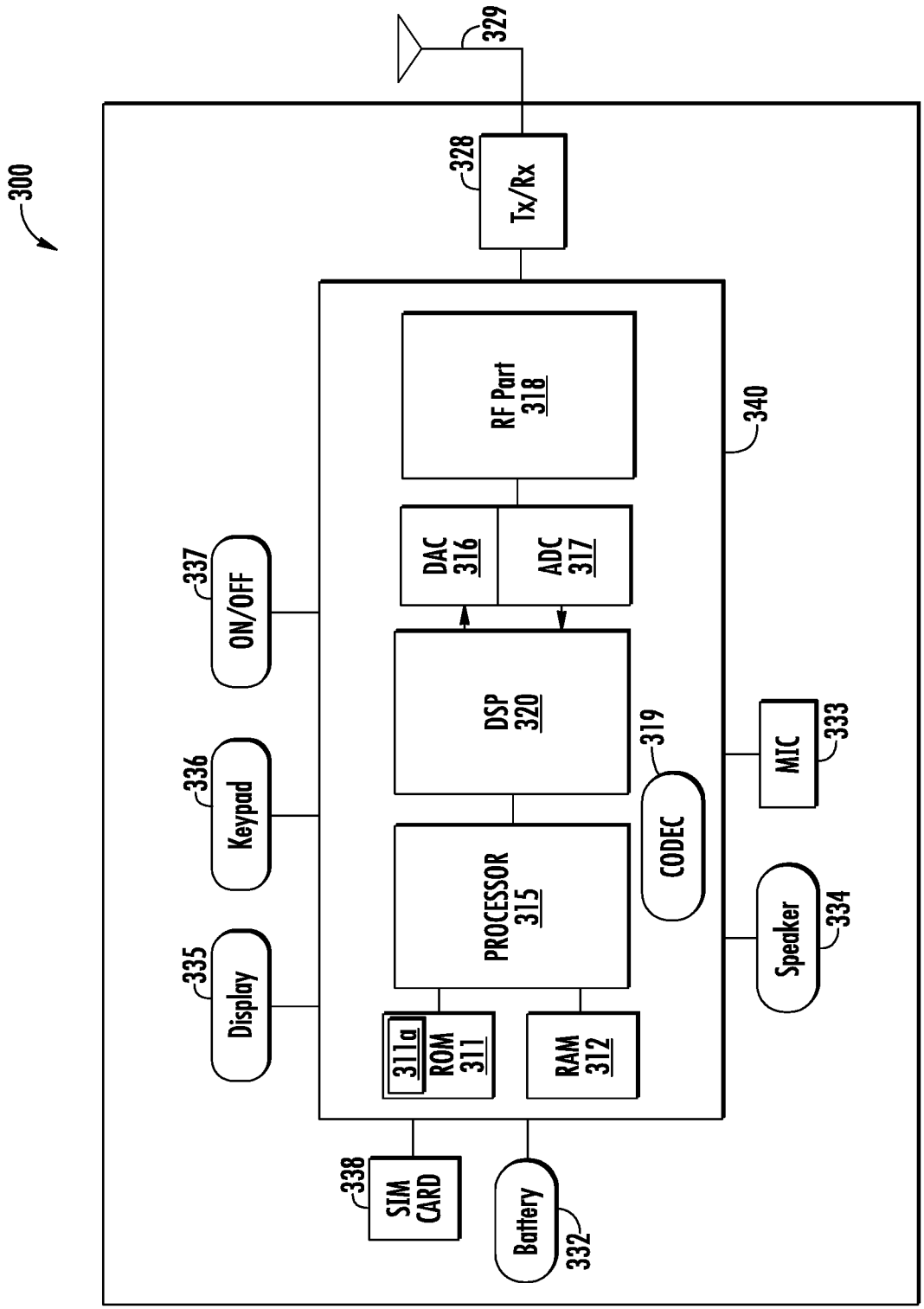
FIG. 3 shows a depiction of an example cellular phone showing its primary electronic components having a display screen, where the phone includes a processor and at least one memory that stores a disclosed non-verbal speech coaching algorithm.

FIG. 1 is a flow chart showing steps for an example method 100 of non-verbal speech training. Step 101 comprises collecting a speaker's voice sample in a communications device comprising a microphone that is coupled to a processor which runs at least a first portion of a disclosed speech analysis and speech coaching algorithm (or application). The speech coaching algorithm is stored in a memory that analyzes speech volume, speech speed, and speech pitch using reference values for each, and has a display screen driven by a display driver controlled by the processor. FIG. 3 described below shows an example cellular phone 300 that includes a processor and at least one memory that stores a disclosed non-verbal speech coaching algorithm that can be the communications device used to implement method 100.

The reference values are numerical values that generally include highest, middle and lowest values for each of the speech volume, speech speed, and speech pitch parameters. The speech analysis part for the algorithm can be stored on a server communicably connected to the communications device that receives the voice samples after a conversation from the communications device, performs the analysis, and sends back values that the first portion of the algorithm to customize the speaker's experience for a next conversation using the communications device. In this split algorithm arrangement where some of the speech processing is performed on a server, it is generally not performed in real-time to give the communications device (e.g. smartphone) the ability to portray immediately actionable information in real-time. As the speaker uses the algorithm more and becomes better at controlling his or her voice the analysis can adjust to continue to challenge him or her to gain more and more fine control.

The reference values are generally a function of at least an age and a sex of the speaker, and can also include cultural/societal qualities of the speaker. The algorithm can be sound activated during a phone/skype call or chat, or be activated outside of a phone call such as while practicing a speech or while on a date.

The communications device can comprise a smart phone such as shown in FIG. 3, a smart watch or a wearable in some embodiments, or a computer device in other embodiments. The algorithm can be packaged as a standalone software application or integrated in an existing product such as salesforce, CRMs, SKYPE, GOOGLE CHAT, CHROME PLUGIN, ALEXA, GOOGLE ASSISTANT or with devices having operating systems that may need a change in their operating system rules to integrate. The processor can comprise a microprocessor, digital signal processor (DSP), or a microcontroller unit (MCU).

Step 102 comprises the algorithm in essentially real-time (the algorithm computation time only) scoring based on the reference values and displaying on the display screen scores for the speech volume, speech speed, and the speech pitch, as well as a displayed recommendation for changing one's speech or providing a favorable speech assessment if all these parameters are determined by comparison to the reference values to meet the reference values or ranges set. The screen scores are not a display of the voice metrics, but rather a person's success at speaking well, similar to a video game score. The displayed scores can be displayed one at a time, or all together.

Disclosed speech training can also include listening training for the user. Listening training can take the form of listening to recorded training conversations (such as between husband and wife, parent and child, teacher and child, person and co-worker, person and boss, person and authority figure) and swiping on a screen to show the voice metrics, or to swipe out of bounds speech back into the normal range. Training can also be accomplished by the speaker hearing the conversation line-by-line and doing his or her best to repeat the content with the same tone and other non-verbal speech parameters.

Disclosed speech training can help a speaker be aware of their non-verbal side of their speech in real-time live, for example during a phone call or speech on parameters such as voice volume, pitch and pace, interrupting the other speaker, and the percentage of time speaking vs. a conversation partner. The algorithm can reflect back to the speaker the non-verbal metrics in a non-distracting way through visual and optionally sound or through a device such as a wearable, a watch, an undershirt, bracelet or necklace that gives sensory information, or smart lava lamp sitting on a table or other supporting surface. The presentation to the speaker is in a way that it is useful by having the algorithm establish in bounds and out of bounds non-verbal speech parameters for the individual and then sets the alert level for him/her when the person steps out of bounds in a non-jarring manner. The speaker will also learn to gain additional control over his/her voice by controlling a visual with those parameters.

The algorithm is useful for being mindful of how a person is speaking in real-time so adjustments can be made by the individual essentially immediately. For example men that tend to have no idea how they sound (especially when speaking to their wives) will find it useful to be alerted when they are speaking too loudly (e.g., yelling), speaking too quickly, or when the pitch of their voice goes up too high. The algorithm can shows subtle, flowing calming changes that reflect the voice when it is in bounds.

When the voice nears out of bounds (relative to the person's particular baseline stored a reference values) then the visualization can be presented in a way where the person understands the correlation between his/her voice and the visualization, why it's out of bounds and how to bring it back towards the baseline. The algorithm is configured to reflect the user's speech and also guide future speech. When the person speaks, and if the speech is typical and acceptable, he or she sees a "still running" routine, with points being scored for a given routine. If the speaker is confirmed to be speaking with all measured non-speech parameters within the person's baseline and there is thus nothing noteworthy, the algorithm can still provide a favorable speech assessment, such as a visualized favorable speech assessment in the form of a displayed score value that is high or near the maximum possible score, such as a score of 85 to 100 for a scoring scale 0 to 100. For example, if a person is too monotone or does not have enough tone variation, the algorithm can determine this and suggest a tone change.

FIGS. 2A-D are scanned screen shots showing example operation a disclosed non-verbal speech coach implemented on a communications device having a processor coupled to at least one memory that stores code for a disclosed speech collection, speech analysis and speech coaching algorithm. The communications device also includes a transceiver, a speaker, a microphone, and a display screen driven by a display driver controlled by the processor.

Figure 2B:
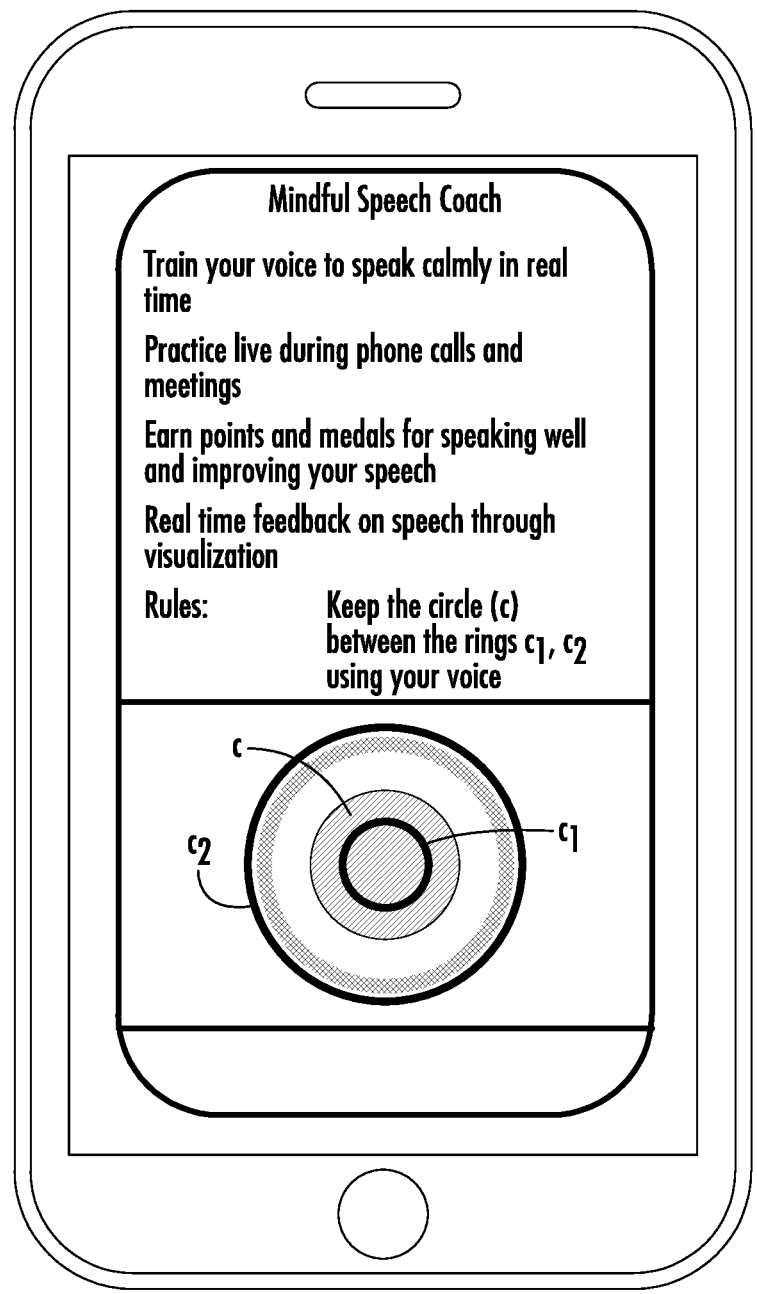
Figure 2C:
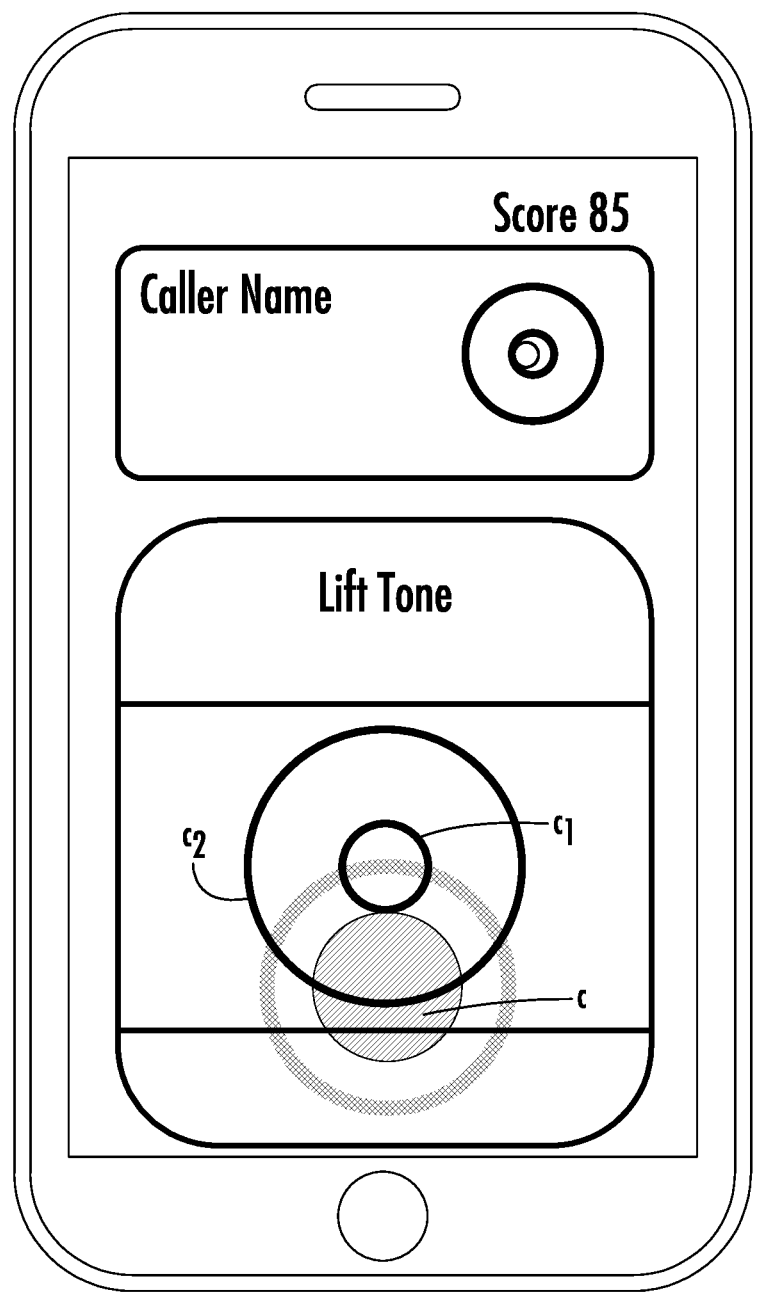
Figure 2D:
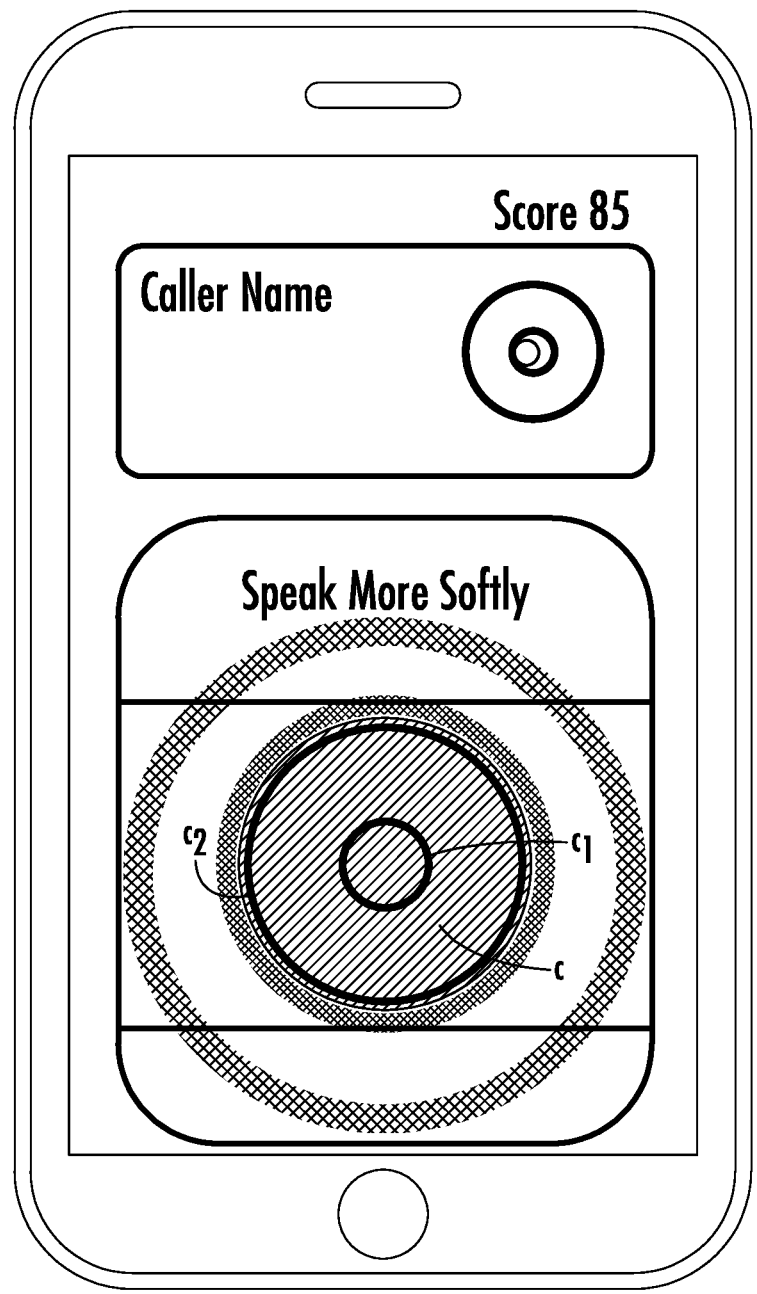

FIG. 2A shows an example screen with fixed inner ring $C_1$ and outer ring $C_2$ as concentric rings. The area between these rings represents optimal non-verbal speech. The filled circle C in the center of the rings is dynamic and represents the user's voice. Changes in the appearance of C in the center represent changes in the user's voice. FIG. 2B shows example instructions given to the user. Using the user's voice, the user is instructed by the communications device to keep C which represents the user's voice within $C_1$ and $C_2$. FIG. 2C shows an example of a change in C representing pitch. As the pitch descends, C descends. This prompts the user to raise his or her pitch. Changes along the y axis represent changes in pitch. FIG. 2D shows C which represents the voice enlarged. The scale of C represents volume. Additional changes include the shape, the color, blinking, the texture, and the position along the x axis, which can all represent additional non-verbal voice qualities such as pacing, interruption, talking time and talking time vs. listening time.

Numerous variations to the disclosed aspects are included. The feedback to the speaker can be through any of the three senses of sight, hearing and touch. As noted above a color change can be in a lava lamp, or tones in ear phones or vibration or other touch sense, for example in a shirt or bracelet. The method can also include a calibrate settings step where the speaker's voice sample is used for the calibration.

The in bounds and out of bounds for the respective non-verbal parameters will generally be set by a combination of initial settings, non-verbal parameter information gathered from all the users using this algorithm (generally in the same language) and non-verbal parameter information from the particular speaker. Accordingly, yelling as an example would be relative to the person's usual speaking volume. Where the person's usual volume is objectively yelling he or she will be coached by the algorithm to bring the baseline voice to within standard volume parameters. The real-time display of information provided is useful to make real-time decisions based on listening in real time to the voice. Because of the natural and healthy variations in pitch, volume and pace, disclosed algorithms avoid showing every change in these parameters which is recognized to be unhelpful and present an information overload that can be annoying to the speaker.

Each session can have a unique session token. If two users are simultaneously logged in, a central server (coupled to their respective devices, such as by an internet connection) can match up both audio streams to deduce information about interactions and interruptions. In this way, the algorithm can commend and award points if a person was yelled at and yet the other conversant keep his decibel level below typical for argument behavior.

A person can also obtain master-level credits if they can bring the other person back to normality. The programmatic work of separating two conversants is done automatically if two different phone's streams are merged on the server.

FIG. 3 shows a depiction of a cellular phone 300 that is generally a smartphone having a display screen 340 shown as a generic mobile phone that can be the communications device used to implement method 100. The cellular phone 300 includes memory shown as Read-only memory (ROM) 311 that generally stores a disclosed non-verbal speech coaching algorithm shown as 311a as firmware and Random-access memory (RAM) 312, a processor 315 such as a microprocessor for running applications, a Digital Signal Processor (DSP) 320, a Digital-to-Analog Converter (DAC) 316, an Analog-to-Digital Converter (ADC) 317. Cellular phone 300 includes a radio frequency (RF) part 318 including an RF frequency up-converter and RF frequency down-converter. The basic component used for frequency conversion by the cellular phone 300 is a radio frequency (RF) mixer. A CODEC (coder-decoder) 319 is also shown included.

The cellular 300 includes an antenna 329 and a transmit/receive (Tx/Rx) switch 328. The Tx/Rx Switch 328 is included as there is only one antenna 329 used for both transmit and receive at different times, where the Tx/Rx Switch 328 is used to connect both the Tx path and the Rx path with one antenna at different times.

The Tx/Rx Switch is controlled automatically by the DSP 320, such as based on a frame structure for Global System for Mobile Communications (GSM) with respect to the physical slot allocated for that particular GSM mobile phone in both downlink and uplink. The baseband processing performed by the DSP 320 converts voice/data to be carried over the air interface into a baseband signal. This is the core part which changes modem to modem for various air interface standards.

For speech/audio, the CODEC 319 is used to compress and decompress the signal to match the data rate to the frame it has to fit in. The ADC 317 and DAC 316 are used to convert analog speech signal to digital signal and vice versa in the mobile. At the transmit path, ADC converted digital signal is given to speech coder. There are various ADCs available, among them popular one is sigma delta type. AGC (Automatic Gain Control) and AFC (Automatic Frequency Control) is used in the receiver path to control gain and frequency. AGC helps maintain working of the DAC 316 satisfactorily, as it keeps signal within the dynamic range of DAC 316. AFC keeps frequency error within limit to achieve better receiver performance.

An Application layer runs on the processor 315. Various applications run in cellular phone 300 including audio, video and image/graphics applications. A battery 332 is the source of power to make/to keep mobile phone functional. A microphone (MIC) 333 includes a transducer that converts sound including the user's voice into an electrical signal converts air pressure variations (result of speech) to electrical signal to couple on the printed circuit board (PCB) for further processing. A speaker 334 converts an electrical signal to audible signal (pressure vibrations) for the user to hear. A display 335 is provided, such as comprising a display driver coupled to a LCD (liquid crystal display), TFT (Thin-film transistor) screen, or OLED (organic light emitting diode) type of display device. A keypad 336, and an on/off switch 337, and a subscriber identification module (SIM) card 338 are also provided.

One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

The invention claimed is:

1. A method of speech training, comprising:
    collecting a speaker's voice sample in a communications device comprising a microphone that is coupled to a processor which runs at least a first portion of a speech collection, speech analysis and speech coaching algorithm (algorithm) stored in a memory that analyzes speech volume, speech speed, and speech pitch using reference values for each, wherein the reference values are a function of at least one non-speech factor regarding a speaker, and a display screen driven by a display driver controlled by the processor;
    the algorithm in essentially real-time scoring the speaker's voice sample based on the reference values, displaying on the display screen scores for the speech volume, speech speed, and the speech pitch, and based on the scores displaying on the display screen an auditory or tactile recommendation for changing at least one of the speech volume, speech speed, and the speech pitch or providing a favorable speech assessment,
    wherein the speech analysis of the algorithm is stored on a server communicably connected to the communications device that receives the speaker's voice sample after a conversation from the communications device and performs the speech analysis and sends back values that the first portion of the algorithm uses to customize a speaker's experience for a next conversation using the communications device.

2. The method of claim 1, wherein the at least one non-speech factor includes at least an age, a sex, a culture, and a geography of the speaker.

3. The method of claim 1, wherein the communications device comprises a smart phone.

4. The method of claim 1, wherein the reference values are numerical values that include a highest, a middle and a lowest value for each of the speech volume, speech speed, and speech pitch.

5. A speech training coach, comprising:
    a communications device having a processor coupled to at least one memory, a transceiver, a speaker, a microphone, and a display screen driven by a display driver controlled by the processor, wherein at least a first portion of a speech collection, speech analysis and speech coaching algorithm (algorithm) is stored in the at least one memory for analyzing speech volume, speech speed, and speech pitch using reference values for each, wherein the reference values are a function of at least one non-speech factor regarding the speaker, the microphone for collecting a speaker's voice sample;

wherein the algorithm is for in essentially real-time scoring the speaker's voice sample based on the reference values, displaying on the display screen scores for the speech volume, speech speed, and the speech pitch, and based on the scores for displaying on the display screen an auditory or tactile recommendation for changing at least one of the speech volume, speech speed, and the speech pitch or providing a favorable speech assessment, wherein the speech analysis of the algorithm is stored on a server communicably connected to the communications device that receives the speaker's voice sample after a conversation from the communications device and performs the speech analysis and sends back values that the first portion of the algorithm uses to customize a speaker's experience for a next conversation using the communications device.

6. The speech training coach of claim 5, wherein the at least one non-speech factor comprises least an age, a sex, a culture, and a geography of the speaker.

7. The speech training coach of claim 5, wherein the communications device comprises a smart phone.

8. The speech training coach of claim 5, wherein the reference values are numerical values that include a highest, a middle and a lowest value for each of the speech volume, speech speed, and speech pitch.

9. The speech training coach of claim 5, wherein the algorithm in its entirety is stored in the memory.

* * * * *